United States Patent
Wang et al.

(10) Patent No.: US 8,605,646 B2
(45) Date of Patent: Dec. 10, 2013

(54) AIR INTERFACE SYNCHRONIZATION METHOD, APPARATUS AND SYSTEM

(75) Inventors: Jing Wang, Beijing (CN); Chunfeng Cui, Beijing (CN); Guangyi Liu, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 136 days.

(21) Appl. No.: 13/381,166

(22) PCT Filed: Jun. 29, 2010

(86) PCT No.: PCT/CN2010/000981
§ 371 (c)(1),
(2), (4) Date: Feb. 23, 2012

(87) PCT Pub. No.: WO2011/000216
PCT Pub. Date: Jan. 6, 2011

(65) Prior Publication Data
US 2012/0134455 A1 May 31, 2012

(30) Foreign Application Priority Data
Jun. 29, 2009 (CN) .......................... 2009 1 0086756

(51) Int. Cl.
*H04B 7/212* (2006.01)
(52) U.S. Cl.
USPC .......................................... 370/324; 370/350
(58) Field of Classification Search
USPC ................. 370/324, 350, 503, 509, 310, 312
See application file for complete search history.

(56) References Cited

U.S. PATENT DOCUMENTS

| 6,119,016 | A  | * | 9/2000 | Matusevich | 455/502 |
| 6,344,821 | B2 | * | 2/2002 | Norimatsu  | 342/387 |
| 7,190,703 | B1 | * | 3/2007 | Heitmann   | 370/508 |
| 8,259,777 | B2 | * | 9/2012 | Li et al.  | 375/142 |

FOREIGN PATENT DOCUMENTS

| CN | 101 123 468 | 2/2008 |
| CN | 101 133 675 | 2/2008 |

* cited by examiner

*Primary Examiner* — Brenda H Pham
(74) *Attorney, Agent, or Firm* — Fay Kaplun & Marcin, LLP

(57) ABSTRACT

An air interface synchronization method is provided. The method includes that: a home-eNodeB which is not synchronized with an eNodeB, intercepts a synchronization subframe transmitted from the eNodeB and/or the home-eNodeB which was already synchronized with the eNodeB, a synchronization reference base station is selected from the base station which transmits the intercepted synchronization subframe, wherein the synchronization subframe includes a special synchronization channel for broadcasting synchronization sequence; the synchronization sequence is obtained, which is broadcasted in the special synchronization channel of the synchronization subframe transmitted by the synchronization reference station, and the synchronization with the synchronization base station is performed according to the synchronization sequence. Also, an air interface synchronization system, an eNodeB and a home-eNodeB are provided. The problem in prior art that the source is wasted in the process of synchronization is solved according to the method, the system, the eNodeB and the home-eNodeB.

13 Claims, 5 Drawing Sheets

AIR INTERFACE SYNCHRONIZATION METHOD, APPARATUS AND SYSTEM

CROSS REFERENCE TO RELATED APPLICATIONS

The present application is a US National Stage of International Application No. PCT/CN2010/000981, filed 29 Jun. 2010, designating the United States, and claiming priority to Chinese Patent Application No. 200910086756.1 filed 29 Jun. 2009.

FIELD

The present invention relates to the field of communications and particularly to an air interface synchronization method, an outdoor base station, an indoor base station and an air interface synchronization system.

BACKGROUND

Co-channel interference is an important factor restricting the capacity of a mobile communication system. With the mobile communication system stepping into the 3G era, co-channel interference has evolved into adjacent cell interference with a more apparent restriction against the capacity of the system as a result of emerging single frequency networking. For a Long Term Evolution (LTE) system, a User Equipment (UE) in a current cell may be subject to both interference from a Base Station (BS) in an adjacent cell and interference from a UE in the adjacent cell. For example, the UE in the current cell is subject to interference from the adjacent cell in the downlink as illustrated in FIG. 1, and this applies alike to interference in the uplink.

In order to avoid the foregoing problem of interference and improve the capacity of the system, strict temporal synchronization between respective base stations is required in the LTE system where there is a synchronization error of no larger than 3 µs between any two cell base stations.

At present, synchronization between different cell base stations in a network is achieved in the LTE system using a timing signal of a Global Positioning System (GPS) in a specific implementation as illustrated in FIG. 2 where the respective cell base stations receive a GPS timing signal transmitted from a satellite for synchronization between the cell base stations.

High-rate data services are an important application of the mobile communication system, and the majority of high-rate data access services take place indoors. However it may be very difficult to provide an indoor user with a high-rate data access service through an outdoor macro cell base station alone due to a significant penetrative loss of a radio signal through a building. Therefore a home femto cell base station providing an indoor high-rate data access service has been widely applied. Also due to a penetrative loss, it may be difficult for the femto cell base station deployed indoors to acquire a GPS timing signal directly, thus making it difficult to synchronize among a plurality of femto cell base stations, and a UE may be subject to both interference from an adjacent femto cell base station and interference from the outdoor macro cell base station particularly as illustrated in FIG. 3.

In the LTE system, the cell base station (i.e., the outdoor base station) can be referred to as an eNodeB or simply an eNB, and the femto cell base station can be referred to as a Home-eNodeB or simply HeNB.

Due to an arbitrary deployment location of the HeNB, the HeNB may be synchronized directly with the eNB or synchronized over multiple hops with the eNB or another HeNB synchronized with the eNB during existing air interface synchronization. A synchronization error may be accumulated with an increasing number of synchronization hops in multi-hop air interface synchronization. The HeNBs may interfere with each other during synchronization as illustrated in FIG. 4 where the HeNB1 is listening to synchronization information of the eNB while the HeNB2 is broadcasting its own synchronization signal, and synchronization reliability and accuracy of the HeNB1 at a short distance from the HeNB2 may be degraded seriously. In order to address this problem, such a solution has been proposed in the prior art that the HeNBs all of which periodically keep silent are changed from a transmission status to a reception status when they are silent to listen to a synchronization signal of the eNB, and at this time none of the base stations will transmit any further signal to the UE.

In all the existing LTE air interface synchronization solutions, a Primary Synchronization Sequence (PSS), a Secondary Synchronization Sequence (SSS) or a Common Reference Signal (CRS) of a seed base station (a synchronized base station) is listened to for synchronization information, and although only one Orthogonal Frequency Division Multiplexing (OFDM) symbol in a sub-frame is occupied for the PSS or the SSS, the minimum unit of a sub-frame is required for listening, thus such listening may result in a waste of an air interface resource. Also for the UE, a Physical Broadcast Channel (PBCH) is located in the same sub-frame as the sequence of SSS, and the HeNB listening to synchronization information transmits no further signal to the UE so that the UE may lose both the sequences of PSS and SSS and broadcast information and thus be influenced greatly. Furthermore the scenario of multi-hop synchronization has not been taken into account for air interface synchronization in the prior art.

SUMMARY

An embodiment of the invention provides an air interface synchronization method to address the problem in the prior art of a resource waste during synchronization, which includes:

an indoor base station unsynchronized with an outdoor base station listening to synchronization sub-frames transmitted from the outdoor base station and/or an indoor base station synchronized with the outdoor base station and selecting a synchronization reference base station from the base stations transmitting the heard synchronization sub-frames, wherein the synchronization sub-frame includes a dedicated synchronization channel over which a synchronization sequence is broadcast; and acquiring the synchronization sequence broadcast over the dedicated synchronization channel which is set by the synchronization reference base station in its transmitted synchronization sub-frame and synchronizing with the synchronization reference base station according to the synchronization sequence.

An embodiment of the invention further provides an air interface synchronization system to address the problem in the prior art of a resource waste during synchronization, which includes:

an outdoor base station configured to broadcast a synchronization sequence over a dedicated synchronization channel which is set in a transmitted synchronization sub-frame; and at least one indoor base station configured to select a synchronization reference base station from base stations transmitting synchronization sub-frames heard by the indoor base station, acquire a synchronization sequence broadcast over a dedicated synchronization channel which is set by the synchronization reference base station in its transmitted synchronization sub-frame and synchronize with the synchronization reference base station according to the synchronization sequence when the indoor base station is not synchronized with the outdoor base station, and to broadcast a synchronization sequence over a dedicated synchronization channel which is set in its transmitted synchronization sub-frame when the indoor base station is synchronized with the outdoor base station.

An embodiment of the invention further provides an outdoor base station to address the problem in the prior art of a resource waste during synchronization, which includes:

a setting module configured to set a dedicated synchronization channel in a transmitted synchronization sub-frame; and a broadcast module configured to broadcast a synchronization sequence over the dedicated synchronization channel which is set by the setting module.

An embodiment of the invention further provides an indoor base station to address the problem in the prior art of a resource waste during synchronization, which includes a determination module, a synchronization module and a broadcast module, wherein:

the determination module is configured to determine whether the indoor base station is currently synchronized with an outdoor base station, and if so, then trigger the broadcast module; otherwise, trigger the synchronization module;

the synchronization module is configured to select a synchronization reference base station from base stations transmitting synchronization sub-frames heard by the indoor base station, to acquire a synchronization sequence broadcast over a dedicated synchronization channel which is set by the synchronization reference base station in its transmitted synchronization sub-frame and to synchronize with the synchronization reference base station according to the synchronization sequence; and the broadcast module is configured to broadcast a synchronization sequence over a dedicated synchronization channel which is set in its transmitted synchronization sub-frame.

The invention has the following advantageous effects:

In the embodiments of the invention, the dedicated synchronization channel over which the synchronization sequence is broadcast is set in the synchronization sub-frame, and the indoor base station unsynchronized with the outdoor base station listens to the synchronization sub-frames transmitted from the outdoor base station and/or the indoor base station(s) synchronized with the outdoor base station and selects the synchronization reference base station, and as compared with the prior art, no resource of one frame has to be wasted specially for synchronization to thereby avoid a resource waste resulting from listening during conventional synchronization and attaining the object of saving a system resource.

DETAILED DESCRIPTION

Figure 1:
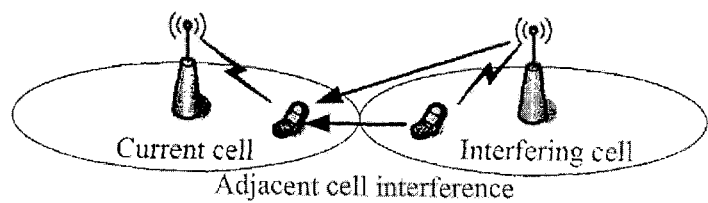
FIG. 1 is a schematic diagram of a UE in a current cell subject to interference from an adjacent cell in the prior art.
Figure 2:
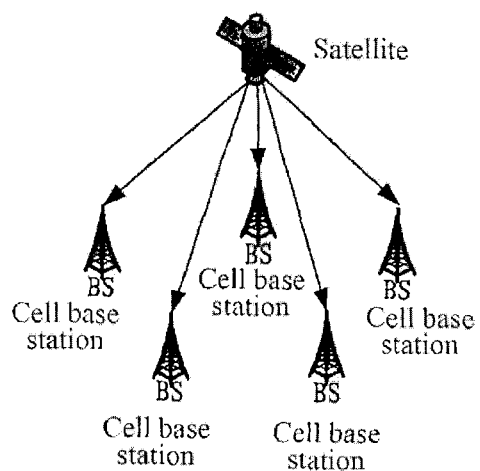
FIG. 2 is a schematic diagram of cell base stations synchronized in an LTE system in the prior art.
Figure 3:
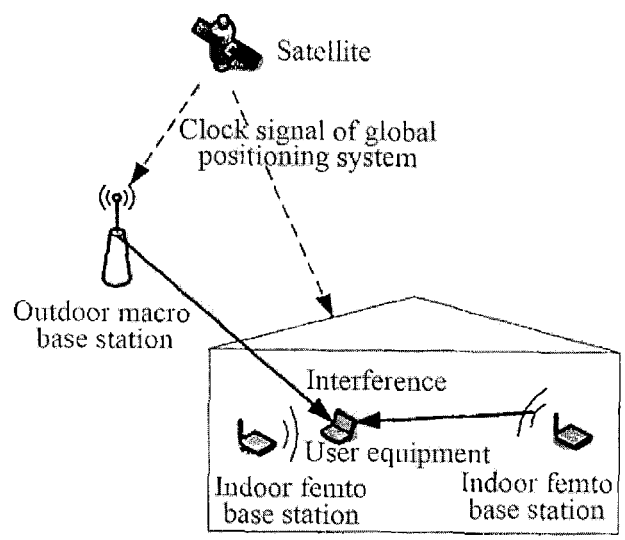
FIG. 3 is a schematic diagram of a UE subject to interface from an outdoor macro base station and an indoor femto base station in the prior art.
Figure 4:
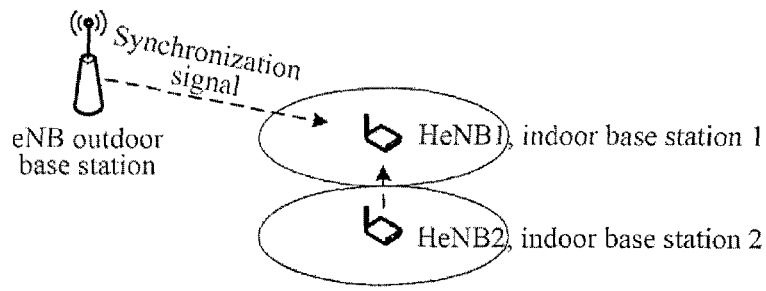
FIG. 4 is a schematic diagram of mutual interference between indoor base stations in the prior art.
Figure 5:
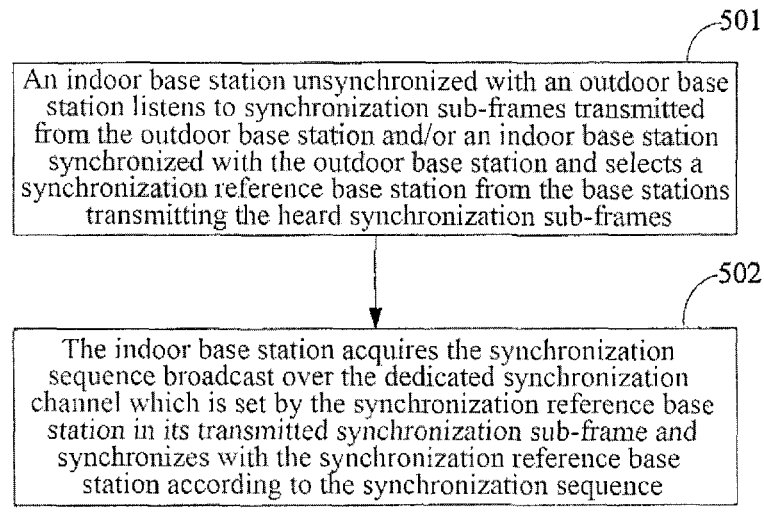
FIG. 5 is a flow chart of an air interface synchronization method according to an embodiment of the invention.

In order to save a system resource, an embodiment of the invention proposes an air interface synchronization method, a specific flow of which is as illustrated in FIG. 5 and includes:

Operation 501. An indoor base station unsynchronized with an outdoor base station listens to synchronization sub-frames transmitted from the outdoor base station and/or an indoor base station synchronized with the outdoor base station and selects a synchronization reference base station from the base stations transmitting the heard synchronization sub-frames, where the synchronization sub-frames each includes a dedicated synchronization channel over which a synchronization sequence is broadcast; and Operation 502. The indoor base station acquires the synchronization sequence broadcast over the dedicated synchronization channel which is set by the synchronization reference base station in its transmitted synchronization sub-frame and synchronizes with the synchronization reference base station according to the synchronization sequence.

To perform the operation 501, the synchronization sequence can be any of various alternatives, and in order to save a resource in effect, some of existing sub-frames can be adapted by setting in the selected sub-frame the dedicated synchronization channel over which the synchronization sequence is broadcast. For example, a Multicast Broadcast Single Frequency Network (MBSFN) sub-frame for communication between an outdoor base station and an indoor base station can be selected, and of course, another sub-frame can be selected as long as no relevant information to be forwarded to a user will be carried over the selected sub-frame. In a preferred embodiment, the dedicated synchronization channel over which the synchronization sequence is broadcast is set in the MBSFN sub-frame, and the following description will be presented taking the MBSFN sub-frame as an example to make the technical solution more apparent.

In an embodiment of the invention, the MBSFN sub-frame can be reserved specially for air interface synchronization or devised for another technology (e.g., relaying in an LTE system) but will not be limited to the former, and can be applicable to the air interface synchronization method according to embodiments of the invention as long as a dedicated synchronization channel is set therein.

In this example, the dedicated synchronization channel over which the synchronization sequence is broadcast is set in the MBSFN sub-frame to make full use of an existing frame resource without wasting a resource of one frame dedicated to synchronization, thereby avoiding a resource waste resulting from listening during conventional synchronization and attaining the object of saving a system resource.

In view of an arbitrary deployment location of an indoor base station, the outdoor base station and the indoor base station synchronized with the outdoor base station can broadcast their own priority information in their transmitted MBSFN sub-frames during synchronization in order to ensure reliability and accuracy of air interface synchronization and avoid interference from another indoor base station. Particularly the priority information can be broadcast in numerous ways, for example, the priority information can be broadcast over the broadcast channel in the MBSFN sub-frame or the priority information can be carried in the synchronization sequence broadcast in the MBSFN sub-frame, and of course the priority information can be broadcast otherwise under a specific condition. Initially the indoor base station synchronized with the outdoor base station may be absent, and only the outdoor base station transmits the MBSFN sub-frame. In this example, the operation 501 is performed in the flow as illustrated in FIG. 5 where the indoor base station unsynchronized with the outdoor base station acquires the priority information of the base stations transmitting the heard MBSFN sub-frames and selects the synchronization reference base station from the base stations transmitting the heard synchronization sub-frames according to the priority information.

In an implementation, the priority information can be any of various alternatives, for example, clock level information, signal strength information, etc. In a preferred embodiment, the clock level information is used as the priority information, and in an implementation, the level 0 can be set as the highest level, the level 1 as the second highest level, and so on. In this example, the outdoor base station is set as the level 0. Of course, another hierarchy method can be utilized under a specific condition, for example, the level 0 can be set as the lowest level. The synchronization reference base station can be selected according to the priority information in an order of descending priorities or in an order of ascending priorities. In this example, the synchronization reference base station is selected in an order of descending priorities in order to ensure reliability and accuracy of synchronization. The indoor base station unsynchronized with the outdoor base station hears the MBSFN sub-frames, acquires their broadcast clock level information and selects the one of the base stations at the highest clock level as the synchronization reference base station. Of course interference coordination information, power control information and other related signaling can be broadcasted in the MBSFN sub-frame in addition to the priority information to make full use of a resource of the MBSFN sub-frame.

In this example, the operation 501 is performed in the flow as illustrated in FIG. 5 where the indoor base station unsynchronized with the outdoor base station sets its own priority information below the priority information of the selected synchronization reference base station after selecting the synchronization reference base station. For example, if the synchronization reference base station is at the level 0, then the priority of the indoor base station is at the level 1; if the synchronization reference base station is at the level 1, then the priority of the indoor base station is at the level 2; and so on.

In this example, the outdoor base station broadcasts the synchronization sequence over the dedicated synchronization channel which is set in each of its transmitted MBSFN sub-frames. When there are a plurality of indoor base stations and the indoor base station synchronized with the outdoor base station is present, the synchronization reference base station selected by the indoor base station unsynchronized with the outdoor base station may be the outdoor base station or the indoor base station synchronized with the outdoor base station, and in order to ensure reliability and accuracy of synchronization, the indoor base station synchronized with the outdoor base station broadcasts the synchronization sequence at least once over the dedicated synchronization channel which is set in its transmitted MBSFN sub-frame in the maximum period $T_1$ of synchronization tracking to ensure one time of successful synchronization tracking. The maximum period $T_{sync.max}$ of synchronization tracking is the largest hop-wise synchronization error $T_{hop}$ of the indoor base station synchronized with the outdoor base station divided by the precision of a local clock, that is, $T_{sync.max}=T_{hop}/S$, where the largest hop-wise synchronization error $T_{hop}$ is the difference between the largest synchronization error T over a network where the indoor base station synchronized with the outdoor base station is located and a synchronization error Te of the outdoor base station, divided by twice the largest number N of synchronization hops over the network, that is, $T_{hop}=(T-Te)/2N$. A synchronization error over the network no larger than the maximum synchronization error can be ensured as long as no hop-wise synchronization error is larger than the largest hop-wise synchronization error $T_{hop}$.

Figure 6:
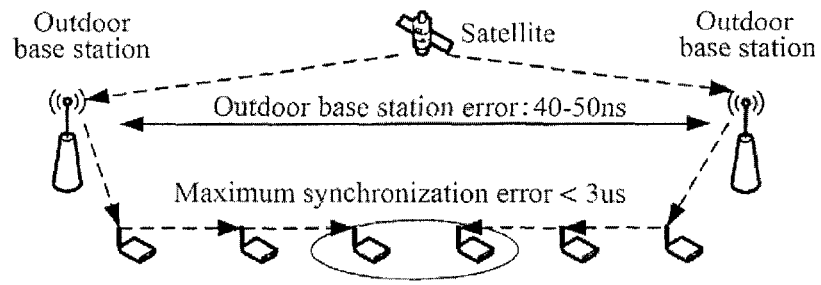
FIG. 6 is a schematic diagram of a multi-hop air interface synchronization network architecture according to an embodiment of the invention.

A specific embodiment will be described now:

In a network as illustrate in FIG. 6, the largest synchronization error T of no larger than 3 μs is specified in the LTE system, a synchronization error Te of the eNB is approximately 40 ns to 50 ns in this example, and in order to ensure reliability and accuracy of synchronization, Te takes 50 ns, and the largest number of synchronization hops over the network is 3, and the largest hop-wise synchronization error $T_{hop}$ is $T_{hop}=(T-Te)/2N=(3-0.05)/(2*3)=0.492$ μs.

Now assumed the precision S of the local clock is 0.25 ppm, and the largest hop-wise synchronization error $T_{hop}$ is 0.492 μs, then the maximum period $T_{sync.max}$ of synchronization tracking can be calculated as $T_{sync.max}=T_{hop}/S=0.492/0.25=1.968$ s, that is, the synchronized indoor base station broadcasts the synchronization sequence at least once over the dedicated synchronization channel which is set in its transmitted MBSFN sub-frame in 1.968 s.

Of course in order to further ensure reliability and accuracy of synchronization, the maximum period $T_{sync.max}$ of synchronization tracking can further be divided into a plurality of sub-periods in each of which the indoor base station synchronized with the outdoor base station broadcasts the synchronization sequence at least once in its transmitted MBSFN sub-frame to maintain a real time synchronization status over the network. Typically the number of sub-periods included in $T_{sync.max}$ is far larger than 1.

In an embodiment of the invention, a plurality of indoor base stations synchronized with each other constitute a synchronization group or simply Sync.Group in which when any one of the indoor base stations synchronized with the outdoor base station broadcasts the synchronization sequence over the dedicated synchronization channel which is set in the transmitted MBSFN sub-frame (i.e., broadcasts synchronization sequence over the dedicated synchronization channel which is set in the transmitted synchronization sub-frame), indoor base stations synchronized with the outdoor base station, which are within a distance of two hops from this indoor base station, are keep silent. In an implementation, the indoor base stations synchronized with the outdoor base station, which are within a distance of two hops from the indoor base station can keep silent in numerous ways, for example, the indoor base station can interactively signal, prior to transmission of the MBSFN sub-frame, the indoor base stations synchronized with the outdoor base station, which are within a distance of two hops from the indoor base station, to keep silent; or the MBSFN sub-frames can be numbered, and the MBSFN sub-frames with predetermined serial numbers can be selected for transmission to thereby avoid interference, or the MBSFN sub-frames can be selected randomly for transmission; and of course the same purpose can be archived otherwise as long as the indoor base stations synchronized with the outdoor base station, which are within a distance of two hops from the indoor base station, can keep silent.

Figure 7:
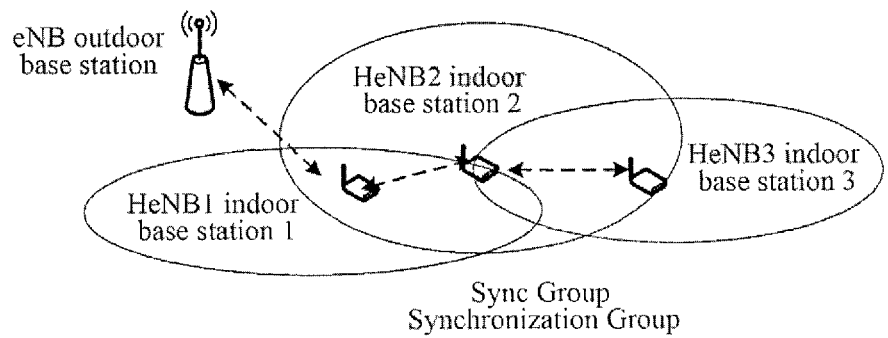
FIG. 7, FIG. 8 and FIG. 9 are schematic diagrams of a network topology according to embodiments of the invention.

A specific example will be described now, and in this example, the HeNB1, the HeNB2 and the HeNB3 constitute a Sync.Group, the HeNB1 is synchronized with reference to the eNB, and the Sync.Group can be in numerous network topologies as illustrated respectively in FIG. 7, FIG. 8 and FIG. 9:

In FIG. 7, the HeNB1 is synchronized with respect to the eNB, the HeNB2 is synchronized with respect to the HeNB1, and the HeNB3 is synchronized with respect to the HeNB2; and the large number of synchronization hops over the network is 3, and the large number of synchronization hops in the Sync.Group is 2.

Figure 8:
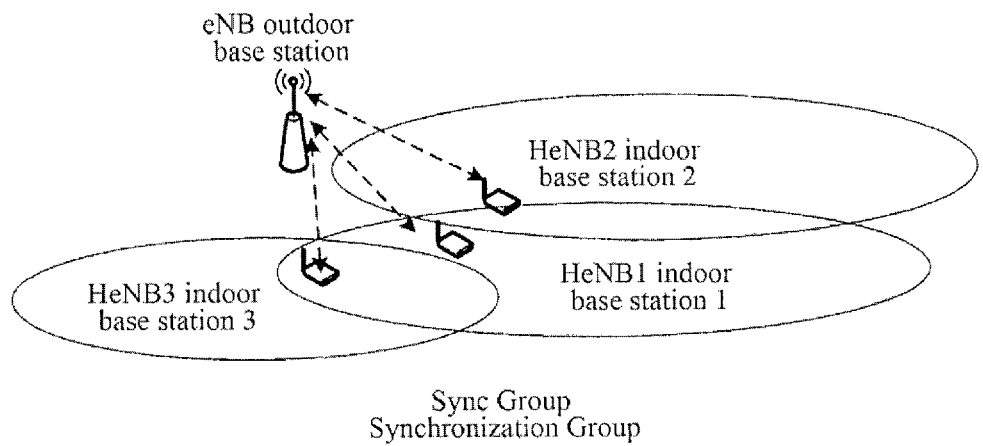

In FIG. 8, all the HeNB1, the HeNB2 and the HeNB3 are synchronized with reference to the eNB, and the large number of synchronization hops over the network is 1.

Figure 9:
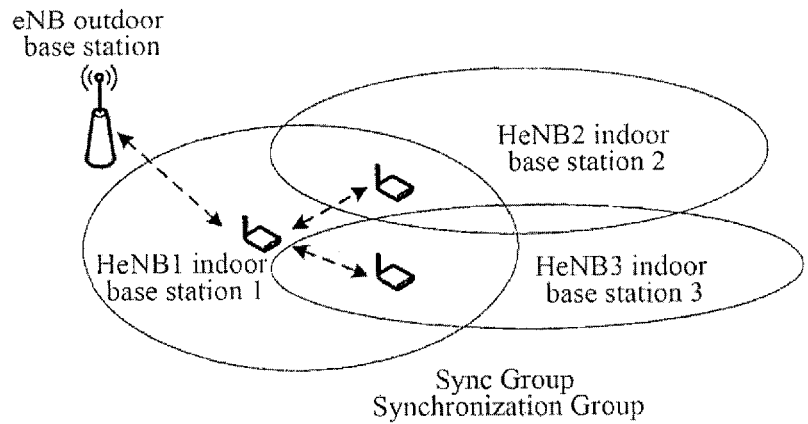

In FIG. 9, the HeNB1 is synchronized with reference to the eNB, and the HeNB2 and the HeNB3 are synchronized with reference to the HeNB1; and the large number of synchronization hops over the network is 2, and the large number of synchronization hops in the Sync.Group is 1.

Figure 10:
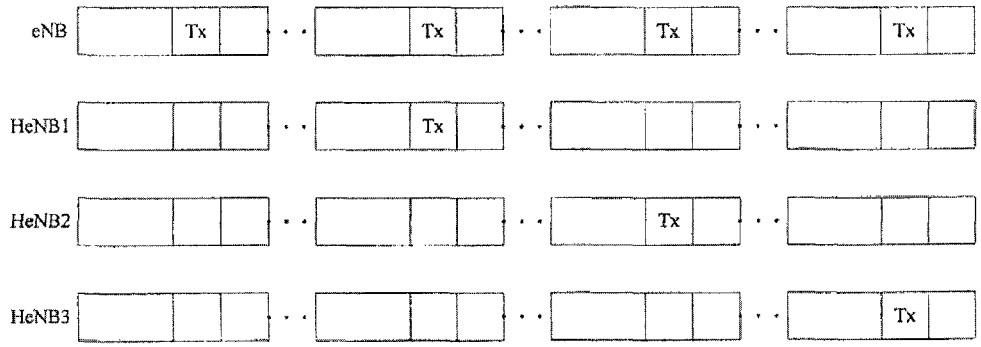
FIG. 10 is a schematic diagram of a silence mechanism according to an embodiment of the invention.

As can be apparent from the topologies of FIG. 7, FIG. 8 and FIG. 9, the large number of synchronization hops in the Sync.Group is no larger than 2 in this example, thus when any HeNB broadcasts the synchronization sequence over the dedicated synchronization channel which is set in its transmitted MBSFN sub-frame, the other HeNBs keep silent in a listening status, and in this example, any HeNB broadcasts a clock level signal Tx in addition to the synchronization sequence over the dedicated synchronization channel which is set in its transmitted MBSFN sub-frame. As illustrated in FIG. 10, the HeNB2 and the HeNB3 keep silent while the HeNB1 is broadcasting the synchronization sequence; and alike the HeNB1 and the HeNB3 keep silent while the HeNB2 is broadcasting the synchronization sequence, and the HeNB1 and the HeNB2 keep silent while the HeNB3 is broadcasting the synchronization sequence.

Of course the foregoing embodiments will not be limited only to the MBSFN sub-frame, and in an implementation, another synchronization sub-frame can be used for air interface synchronization, and a specific implementation thereof will be similar to the implementation in which the MBSFN sub-frame is used for air interface synchronization.

Figure 11:
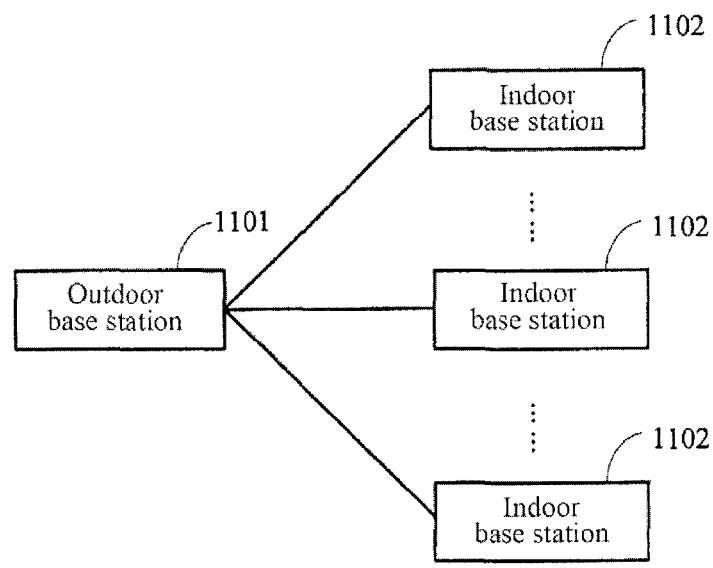
FIG. 11 is a schematic structural diagram of an air interface synchronization system according to an embodiment of the invention.

Based upon the same inventive idea, an embodiment of the invention further provides an air interface synchronization system as illustrated in FIG. 11 which includes:

an outdoor base station 1101 configured to broadcast a synchronization sequence over a dedicated synchronization channel which is set in a transmitted synchronization sub-frame; and at least one indoor base station 1102 configured to select a synchronization reference base station from base stations transmitting synchronization sub-frames heard by the indoor base station, acquire a synchronization sequence broadcast over a dedicated synchronization channel which is set by the synchronization reference base station in its transmitted synchronization sub-frame and synchronize with the synchronization reference base station according to the synchronization sequence when the indoor base station is not synchronized with the outdoor base station, and to broadcast a synchronization sequence over a dedicated synchronization channel which is set in its transmitted synchronization sub-frame when the indoor base station is synchronized with the outdoor base station.

In an embodiment, a plurality of indoor base stations synchronized with each other constitute a synchronization group in which when any one of the indoor base stations synchronized with the outdoor base station broadcasts the synchronization sequence over the dedicated synchronization channel which is set in its transmitted MBSFN sub-frame, indoor base stations, synchronized with the outdoor base station and within a distance of two hops from this indoor base station, keep silent. In an implementation, the indoor base stations synchronized with the outdoor base station, which are within a distance of two hops from this indoor base station can keep silent in numerous ways, for example, the indoor base station can interactively signal, prior to transmission of the MBSFN sub-frame, the indoor base stations synchronized with the outdoor base station, which are within a distance of two hops from the indoor base station, to keep silent; or the MBSFN sub-frames can be numbered, and the MBSFN sub-frames with predetermined serial numbers can be selected for transmission to thereby avoid interference, or the MBSFN sub-frames can be selected randomly for transmission; and of course the same purpose can be archived otherwise as long as the indoor base stations synchronized with the outdoor base station, which are within a distance of two hops from the indoor base station, can keep silent.

In an embodiment, the outdoor base station 1101 can further be configured to broadcast its own priority information in its transmitted synchronization sub-frame.

The indoor base station 1102 can further be configured to acquire priority information of the base stations transmitting the heard synchronization sub-frames and select the synchronization reference base station from the base stations transmitting the heard synchronization sub-frames according to the priority information when the indoor base station is not synchronized with the outdoor base station, and to broadcast its own priority information in its transmitted synchronization sub-frame when the indoor base station is synchronized with the outdoor base station.

In an embodiment, the indoor base station 1102 can further be configured to set its own priority information below the priority information of the synchronization reference base station after selecting the synchronization reference base station from the base stations transmitting the heard synchronization sub-frames according to the priority information.

In an embodiment, the outdoor base station 1101 can further be configured to broadcast the synchronization sequence in the dedicated synchronization channel which is set in each of its transmitted synchronization sub-frames.

In an embodiment, the indoor base station 1102 can further be configured to broadcast the synchronization sequence at least once over the dedicated synchronization channel which is set in its transmitted synchronization sub-frame in the maximum period of synchronization tracking when the indoor base station is synchronized with the outdoor base station, where the maximum period of synchronization tracking is the largest hop-wise synchronization error over a network where the indoor base station is located divided by the precision of a local clock, and the largest hop-wise synchronization error is the difference between the largest synchronization error over the network where the indoor base station is located and a synchronization error of the outdoor base station, divided by twice the largest number of synchronization hops over the network.

In an embodiment, the indoor base station 1102 can further be configured to divide the maximum period of synchronization tracking into a plurality of sub-periods and broadcast the synchronization sequence at least once in its transmitted synchronization sub-frame in each of the sub-periods when the indoor base station is synchronized with the outdoor base station.

Figure 12:
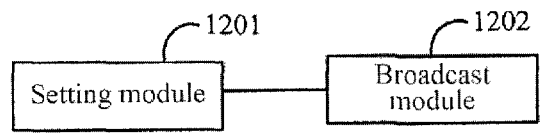
FIG. 12 is a schematic structural diagram of an outdoor base station according to an embodiment of the invention.

Based upon the same inventive idea, an embodiment of the invention further provides an outdoor base station particularly as illustrated in FIG. 12 which includes:

a setting module 1201 configured to set a dedicated synchronization channel in a transmitted synchronization sub-frame; and a broadcast module 1202 configured to broadcast a synchronization sequence over the dedicated synchronization channel which is set by the setting module 1201.

Figure 13:
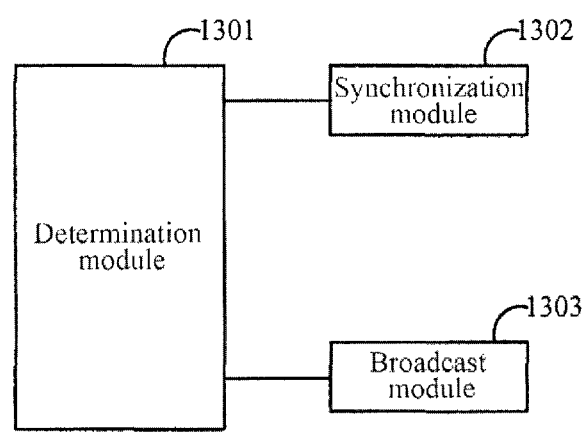
FIG. 13 is a schematic structural diagram of an indoor base station according to an embodiment of the invention.

Based upon the same inventive idea, an embodiment of the invention further provides an indoor base station particularly as illustrated in FIG. 13 which includes a determination module 1301, a synchronization module 1302 and a broadcast module 1303, where:

the determination module 1301 is configured to determine whether the indoor base station is currently synchronized with an outdoor base station, and if so, then trigger the broadcast module 1303; otherwise, trigger the synchronization module 1302;

the synchronization module 1302 is configured to select a synchronization reference base station from base stations transmitting synchronization sub-frames heard by the indoor base station, to acquire a synchronization sequence broadcast over a dedicated synchronization channel which is set by the synchronization reference base station in its transmitted synchronization sub-frame and to synchronize with the synchronization reference base station according to the synchronization sequence; and the broadcast module 1303 is configured to broadcast a synchronization sequence over a dedicated synchronization channel which is set in its transmitted synchronization sub-frame.

In an embodiment, the broadcast module is further configured to cause indoor base stations synchronized with the outdoor base station, which are within a distance of two hops from the indoor base station, to keep silent while broadcasting the synchronization sequence over the dedicated synchronization channel in the transmitted synchronization sub-frame.

Particularly the broadcast module can cause the indoor base stations synchronized with the outdoor base station, which are within a distance of two hops from the indoor base station, to keep silent in the following ways (but not limited thereto): the indoor base stations synchronized with the outdoor base station, which are within a distance of two hops from the indoor base station, are interactively signaled prior to transmission of the synchronization sub-frame to keep silent; or the synchronization sub-frames are numbered, and the synchronization sub-frames with predetermined serial numbers are selected for transmission, or the synchronization sub-frames are selected randomly for transmission; and of course the broadcast module can achieve the same purpose otherwise as long as the indoor base stations synchronized with the outdoor base station, which are within a distance of two hops from the indoor base station, can keep silent.

In an embodiment, the synchronization module 1302 can further be configured to acquire priority information of the base stations transmitting the heard synchronization sub-frames and to select the synchronization reference base station from the base stations transmitting the heard synchronization sub-frames according to the priority information.

The broadcast module 1303 can further be configured to broadcast priority information of the indoor base station in the transmitted synchronization sub-frame when the indoor base station is synchronized with the outdoor base station.

In an embodiment, the synchronization module 1302 can further be configured to set its own priority information below the priority information of the synchronization reference base station after selecting the synchronization reference base station from the base stations transmitting the heard synchronization sub-frames according to the priority information.

In an embodiment, the broadcast module 1303 can further be configured to broadcast the synchronization sequence at least once over the dedicated synchronization channel which is set in the transmitted synchronization sub-frame in the maximum period of synchronization tracking, where the maximum period of synchronization tracking is the largest hop-wise synchronization error over a network where the indoor base station is located divided by the precision of a local clock, and the largest hop-wise synchronization error is the difference between the largest synchronization error over the network where the indoor base station is located and a synchronization error of the outdoor base station, divided by twice the largest number of synchronization hops over the network.

In an embodiment, the broadcast module 1303 can further be configured to divide the maximum period of synchronization tracking into a plurality of sub-periods and to broadcast the synchronization sequence at least once in the transmitted synchronization sub-frame in each of the sub-periods.

In the embodiments of the invention, the dedicated synchronization channel over which the synchronization sequence is broadcast is set in the synchronization sub-frame, and the indoor base station unsynchronized with the outdoor base station listens to the synchronization sub-frames transmitted from the outdoor base station and/or the indoor base station(s) synchronized with the outdoor base station and selects the synchronization reference base station, and as compared with the prior art, no resource of one frame has to be wasted specially for synchronization to thereby avoid a resource waste resulting from listening during conventional synchronization and attaining the object of saving a system resource.

Furthermore in the embodiments of the invention, the synchronization sub-frame (e.g., the MBSFN sub-frame) carries no relevant information to be broadcast to the UE, thus the UE will not be influenced greatly in such case that no further signal will be transmitted to the UE while listening to the synchronization information.

Furthermore in the embodiments of the invention, the synchronization sub-frame can further broadcast relevant information, e.g., the priority information, etc., to make full use of resources in the synchronization sub-frame, where the priority information can be used to select the synchronization reference base station with a smaller synchronization error, to control effectively the number of synchronization hops over the network, to alleviate an accumulated synchronization error due to multi-hop synchronization, to improve reliability and accuracy of synchronization and to limit an extra overhead resulting from synchronization.

Furthermore in the embodiments of the invention, it is ensured that the indoor base station synchronized with the outdoor base station can broadcast the synchronization sequence at least once over the dedicated synchronization channel which is set in its transmitted synchronization subframe in the maximum period of synchronization tracking while taking into account a synchronization error potentially arising over the network and the precision of the local clock to thereby avoid a loss of synchronization during synchronization.

Evidently those skilled in the art can make various modifications and variations to the invention without departing from the scope of the invention. Thus the invention is also intended to encompass these modifications and variations thereto as long as the modifications and variations come into the scope of the claims appended to the invention and their equivalents.

The invention claimed is:

1. An air interface synchronization method, comprising:
   an indoor base station unsynchronized with an outdoor base station listening to synchronization sub-frames transmitted from the outdoor base station and/or an indoor base station synchronized with the outdoor base station and selecting a synchronization reference base station from the base stations transmitting the synchronization sub-frames heard by the unsynchronized indoor base station, wherein each of the synchronization sub-frames comprises a dedicated synchronization channel over which a synchronization sequence is broadcast; and
   acquiring the synchronization sequence broadcast over the dedicated synchronization channel which is set by the synchronization reference base station in its transmitted synchronization sub-frame and synchronizing with the synchronization reference base station according to the synchronization sequence.

2. The method of claim 1, wherein when any indoor base station synchronized with the outdoor base station broadcasts the synchronization sequence over the dedicated synchronization channel which is set in the transmitted synchronization sub-frame, respective indoor base stations, synchronized with the outdoor base station and within a distance of two hops from the indoor base station, keep silent.

3. The method of claim 2, wherein the indoor base station synchronized with the outdoor base station causes the indoor base stations, synchronized with the outdoor base station and within a distance of two hops from the indoor base station, to keep silent by:
   interactively signal, prior to transmission of the synchronization sub-frame, the indoor base stations, synchronized with the outdoor base station and within a distance of two hops from the indoor base station, to keep silent; or
   numbering synchronization sub-frames and selecting a synchronization sub-frame with a predetermined serial number for transmission; or
   selecting randomly a synchronization sub-frame for transmission.

4. The method of claim 1, wherein the outdoor base station and the indoor base station synchronized with the outdoor base station broadcast their own priority information in their transmitted synchronization sub-frames; and
   the indoor base station unsynchronized with the outdoor base station selecting the synchronization reference base station from the base stations transmitting the heard synchronization sub-frames comprises:
   the indoor base station unsynchronized with the outdoor base station acquiring the priority information of the base stations transmitting the heard synchronization sub-frames and selecting the synchronization reference base station from the base stations transmitting the heard synchronization sub-frames according to the priority information; and
   the method further comprises: after the indoor base station unsynchronized with the outdoor base station selects the synchronization reference base station from the base stations transmitting the heard synchronization sub-frames according to the priority information, the indoor base station unsynchronized with the outdoor base station setting its own priority information below the priority information of the synchronization reference base station.

5. The method of claim 1, wherein the outdoor base station broadcasts the synchronization sequence over the dedicated synchronization channel which is set in each of its transmitted synchronization sub-frames.

6. The method of claim 5, wherein the indoor base station synchronized with the outdoor base station broadcasts the synchronization sequence at least once over the dedicated synchronization channel which is set in its transmitted synchronization sub-frame in the maximum period of synchronization tracking;
   the maximum period of synchronization tracking is the largest hop-wise synchronization error of the indoor base station synchronized with the outdoor base station divided by the precision of a local clock; and
   the largest hop-wise synchronization error is the difference between the largest synchronization error over a network where the indoor base station synchronized with the outdoor base station is located and a synchronization error of the outdoor base station, divided by twice the largest number of synchronization hops over the network.

7. The method of claim 6, wherein the indoor base station synchronized with the outdoor base station broadcasts the synchronization sequence at least once over the dedicated synchronization channel which is set in its transmitted synchronization sub-frame in the maximum period of synchronization tracking comprises:
   dividing the maximum period of synchronization tracking into a plurality of sub-periods; and
   the indoor base station synchronized with the outdoor base station broadcasting the synchronization sequence at least once in its transmitted synchronization sub-frame in each of the sub-periods.

8. An air interface synchronization system, comprising:
   an outdoor base station configured to broadcast a synchronization sequence over a dedicated synchronization channel which is set in a transmitted synchronization sub-frame; and
   at least one indoor base station configured to select a synchronization reference base station from base stations transmitting synchronization sub-frames heard by the indoor base station, acquire a synchronization sequence broadcast over a dedicated synchronization channel which is set by the synchronization reference base station in its transmitted synchronization sub-frame and synchronize with the synchronization reference base station according to the synchronization sequence when the indoor base station is not synchronized with the outdoor base station, and to broadcast a synchronization sequence over a dedicated synchronization channel which is set in its transmitted synchronization sub-frame when the indoor base station is synchronized with the outdoor base station.

9. The system of claim 8, wherein when any indoor base station synchronized with the outdoor base station broadcasts the synchronization sequence over the dedicated synchronization channel which is set in the transmitted synchronization sub-frame, indoor base stations, synchronized with the outdoor base station and within a distance of two hops from the indoor base station, keep silent.

10. The system of claim 8, wherein the outdoor base station is further configured to broadcast its own priority information in its transmitted synchronization sub-frame;

the indoor base station is further configured to acquire priority information of base stations transmitting synchronization sub-frames heard by the indoor base station and select the synchronization reference base station from the base stations transmitting the heard synchronization sub-frames according to the priority information when the indoor base station is not synchronized with the outdoor base station, and to broadcast its own priority information in its transmitted synchronization sub-frame when the indoor base station is synchronized with the outdoor base station; and the indoor base station is further configured to set its own priority information below the priority information of the synchronization reference base station after selecting the synchronization reference base station from the base stations transmitting the heard synchronization sub-frames according to the priority information.

11. The system of claim 8, wherein the outdoor base station is further configured to broadcast the synchronization sequence in the dedicated synchronization channel which is set in each of its transmitted synchronization sub-frames.

12. The system of claim 8, wherein the indoor base station is further configured to broadcast the synchronization sequence at least once over the dedicated synchronization channel which is set in its transmitted synchronization sub-frame in the maximum period of synchronization tracking when the indoor base station is synchronized with the outdoor base station, the maximum period of synchronization tracking is the largest hop-wise synchronization error over a network where the indoor base station is located divided by the precision of a local clock, and the largest hop-wise synchronization error is the difference between the largest synchronization error over the network where the indoor base station is located and a synchronization error of the outdoor base station, divided by twice the largest number of synchronization hops over the network.

13. The system of claim 12, wherein the indoor base station is further configured to divide the maximum period of synchronization tracking into a plurality of sub-periods and broadcast the synchronization sequence at least once in its transmitted synchronization sub-frame in each of the sub-periods when the indoor base station is synchronized with the outdoor base station.

* * * * *